Nov. 25, 1958 A. W. TRONNIER 2,861,500
OBJECTIVE LENS OF EXTREMELY HIGH RELATIVE APERTURE
Filed Nov. 14, 1955

INVENTOR
ALBRECHT W. TRONNIER
BY
ATTORNEYS

United States Patent Office 2,861,500
Patented Nov. 25, 1958

2,861,500
OBJECTIVE LENS OF EXTREMELY HIGH RELATIVE APERTURE

Albrecht Wilhelm Tronnier, New York, N. Y., assignor to Farrand Optical Co., Inc., New York, N. Y., a corporation of New York Application November 14, 1955, Serial No. 546,381

6 Claims. (Cl. 88—57)

This invention relates to a very fast objective for photographic purposes, particularly for the photography of fast-moving objects under unfavorable light conditions, for example in motion picture and television work.

For such uses objectives are required having a relative aperture greater than $f/1.5$ and a total field angle of about 25°, and in which for achievement of high definition the primary and zonal spherical aberration must over the entire aperture be kept below some $3/1000$ of the equivalent focal length and in which moreover the astigmatic errors must be kept below $4/1000$ of the equivalent focal length over the entire field.

Objectives having these properties have hitherto been available only for relative apertures up to about $f/1.8$. Insofar as the relative apertures of such systems have been extended substantially beyond $f/1.8$, for example to $f/1.3$ or $f/1.2$, it has almost automatically followed that the primary and zonal spherical errors were substantially increased or that the astigmatic errors increased to some 1% of the focal length or more, or else the useful field was reduced to 10° or at most 15°. In most of the previous proposals indeed two or more of these deleterious effects appeared as concomitants of such increase in relative aperture.

These disadvantages of the very rapid objectives hitherto available are overcome by the present invention, which makes possible an increase in relative aperture to $f/1.2$ or beyond while retaining the high degree of correction in spherical and astigmatic errors above mentioned over the entire system aperture and over the entire field. Accordingly the new objectives of the invention represent a substantially improved means made available to photographic practice, particularly in the taking of photographs under unfavorable light conditions.

Figure 1:
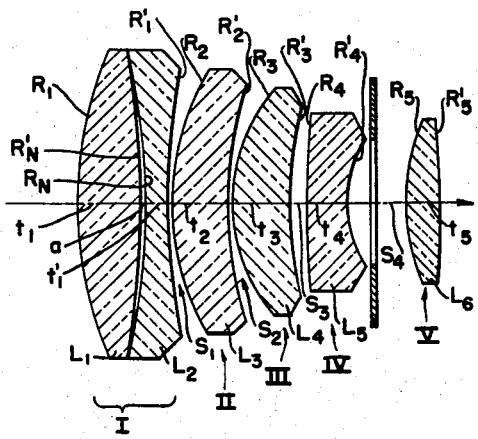
Figure 2:
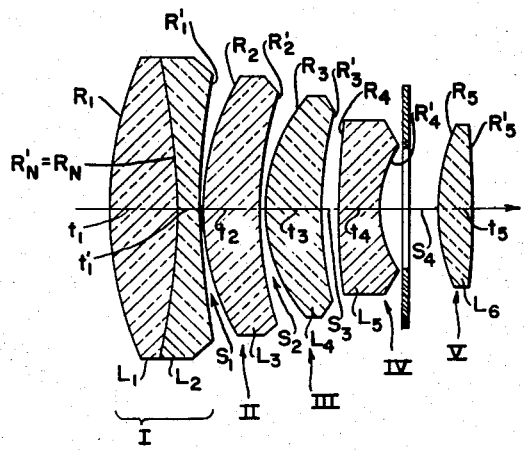

In the accompanying drawings Fig. 1 shows an objective according to a preferred form of the invention, and Fig. 2 shows another embodiment of the invention, slightly simplified from that of Fig. 1.

The new objective according to the invention is so composed of five air-spaced lens components that, viewed from the side of the long conjugate toward the short conjugate, the following components are provided:

I. A doublet having the shape of a positive meniscus concave toward the diaphragm which follows, the doublet being composed of a biconvex positive element $L_1$ and of a biconcave negative element $L_2$ on the diaphragm side of the positive element.

II. A meniscus element $L_3$ of positive power, also concave toward the diaphragm, the convex front surface of this meniscus presented to the long conjugate side being more strongly curved than the corresponding front surface of the doublet I which precedes it.

III. A meniscus element $L_4$ of positive power having for its two surfaces the same signs respectively as have the corresponding surfaces of components I and II. The convex front surface of this element, which is presented to the components I and II, is more strongly curved than is the corresponding surface of component II.

IV. A divergent element $L_5$ of strong negative power having surfaces of unequal curvature, its strongly divergent surface presented to the succeeding diaphragm being likewise concave.

DIA. A diaphragm disposed in the large air space between components IV and V.

V. As the last component of the objective, a convergent element $L_6$ of high power having surfaces of unequal curvature, positioned on the short conjugate side of the diaphragm.

The new objective according to the invention can be schematically described as follows, with reference to the identification of its components I, II, III, IV, DIA and V:

| I | II | III | IV | DIA | V |
|---|---|---|---|---|---|
| +D | +M | +M | −U | diaphragm | +U |

Here the plus and minus signs identify the sign of the powers. The letter D identifies component I as a doublet. The letter M characterizes the components II and III as components of meniscus shape, and the letter U characterizes components IV and V even more broadly as components having unequally curved surfaces.

The distribution of power among the components preceding the diaphragm on the long conjugate side is indicated by the following scheme:

| I | II | III | IV |
|---|---|---|---|
| +− | + | + | − |

Here the plus and minus signs for the first component refer of course respectively to the first and second elements $L_1$ and $L_2$ of the doublet I. Within this fundamental make-up, the objective is so dimensioned consistently with the properties desired for it that the front surfaces of the four collecting or positive power components I, II, III and V, which surfaces are dominant with respect to the dioptric power of the system, and the concave rear surface of the negative element IV (which has in absolute value the largest power within the entire system), possess a distribution of radii according to the following set of relations:

$$0.56\, R_1 < R_2 < 0.88\, R_1$$
$$0.36\, R_1 < R_3 < 0.56\, R_1$$
$$0.18\, R_1 < R'_4 < 0.36\, R_1$$
$$0.30\, R_1 < R_5 < 0.90\, R_1$$

In these inequalities $R_2$ is the front radius of the positive component II, $R_3$ is that of the component III, $R'_4$ is the radius of the rear surface of the negative component IV, and $R_5$ is the front radius of the last component V, all with respect to the front radius $R_1$ of the doublet I. It will be remembered that this doublet is composed of two elements $L_1$ and $L_2$ of opposite power to form together the convergent meniscus-shaped front component whose exterior surfaces like those of the following positive meniscus components II and III are concave toward the diaphragm.

It is known that for the achievement of a relatively simple make-up of an optical system the distribution of power among the various components is important. This is particularly true for systems of high relative aperture, as in the case of the present invention. This criterion leads to the following definition of characteristic properties of the lenses of the invention:

(1) The sum of the surface powers of the two exterior surfaces of the doublet I, which are concave toward the diaphragm, is greater than 16% but less than 40% of the equivalent power of the entire objective.

(2) This surface power sum of the exterior surfaces of the doublet I is between 24% and 48% of the sum of the surface powers of the two surfaces of the positive meniscus III, which among the components on the long conjugate side of the diaphragm is the last positive one and has the greatest positive power.

(3) The sum of the surface powers of the two surfaces of the convergent meniscus II is between 60% and 140% of the sum of the surface powers of the two exterior surfaces of the doublet I.

In this connection it will be remembered that the surface power of an air-glass interface having a radius of R or R' millimeters (according as it is a front or rear surface) is measured in diopters as a function of the glass index $n_i$ according to either of the following well-known formulas:

For passage from air to glass: $\phi_i = 1000(n_i-1)/R_i$
For passage from glass to air: $\phi'_i = 1000(1-n_i)/R'_i$ Here, for the powers of the separate surfaces, the subscript $i$ will be allowed to assume successively the values 1–5, corresponding respectively to the components I–V. The surface power sums $\phi_I$–$\phi_V$ of the components may then be written as follows:

$$\phi_I = \phi_1 + \phi'_1$$
$$\phi_{II} = \phi_2 + \phi'_2$$
$$\phi_{III} = \phi_3 + \phi'_3$$
$$\phi_{IV} = \phi_4 + \phi'_4$$
$$\phi_V = \phi_5 + \phi'_5$$

The total power of the system is equal to the reciprocal of the equivalent focal length and is denoted $\Phi$. The three characteristic properties of the objective of the invention which have been set forth in numbered subparagraphs of the preceding paragraph may then be summarized as follows:

(1) $\quad 0.16\Phi < \phi_I < 0.40\Phi$
(2) $\quad 0.24\phi_{III} < \phi_I < 0.48\phi_{III}$
(3) $\quad 0.60\phi_I < \phi_{II} < 1.40\phi_I$ A further feature of the invention lies in the choice of power for the positive component V on the image side of the system. Thus consistently with the foregoing, the sum $\phi_V$ of the surface powers of the two air-glass interfaces of this component is between 400% and 760% of the sum $\phi_I$ of the surface powers of the front doublet I. This fourth property may be written as follows:

(4) $\quad 4.0\phi_I < \phi_V < 7.6\phi_I$

The surprising significance in the performance of the lens of this additional dimensional criterion may be explained by considering that if the power of the component V were decreased below the minimum value $4.0\phi_I$ thus specified the result must be an excessive concentration of positive power in the components I–IV in order to retain sufficient over-all power and speed for the objective. There would then result a substantial increase in the errors of high aperture bundles and in the intermediate zonal aberrations thereof. If on the other hand the power of the component V were increased beyond the maximum value of $7.6\phi_I$, the result would be an excessive concentration of power on the image side of the system. This would result not only in a marked increase in distortion but also in a noticeable and undesirable field curvature.

It further appears that in addition to the advantages already mentioned it is possible to achieve for the objectives of the present invention a very great reduction in the difference between the sagittal and meridional image surfaces by so proportioning the powers of the divergent concave rear faces of the positive meniscus components II and III that the sum $(\phi'_2 + \phi'_3)$ of the surface powers of those faces is between $-2.25$ and $-5.75$ times the sum $\phi_I$ of the surface powers of the front doublet I. In this way there is provided with respect to the doublet such an excess of astigmatic overcorrection in components II and III that the undercorrection introduced by the doublet is not only fully compensated but further there remains such an excess of overcorrection as to make possible in conjunction with the operation of the components IV and V achievement of the previously specified image performance over the entire field. Thus, algebraically:

$$2.25\phi_I < -(\phi'_2 + \phi'_3) < 5.75\phi_I$$

The lenses illustrated in Figs. 1 and 2 both embody the characteristic properties of the invention which have just been discussed. Two specific examples of lenses according to the invention will now be described. The table entitled Example 1, Table 1 gives data for a lens of the type illustrated in Fig. 1, and that entitled Example 2 gives data for a lens of the type illustrated in Fig. 2. In these tables R and R', with numbered subscripts corresponding to the successive components, are respectively the radii of the exterior front and rear air-glass interfaces of the components. At the chromatically overcorrecting pair of adjacent surfaces enclosed within the doublet, $R_N$ is the radius of the front surface of the biconcave rear element, and $R'_N$ is the radius of the rear face of the biconvex front element of this doublet. The axial spacing, if any, of these surfaces of radii $R_N$ and $R'_N$ is identified as $a$. The axial thicknesses of the lens components are identified by the letter $t$ with appropriate subscripts and the axial spacings of the components are similarly identified by the letter $s$. The glasses are identified by Abbe numbers $\nu$ and refractive indices $n$, referred to the yellow helium line $d$ of 5876 Angstrom units wave length.

*Example 1, Table 1 (linear dimensions in mm.)*

[Equivalent focal length $f=100.00$ mm. Relative aperture $f./1.2$.]

| Component | Lens | $n$ | $\nu$ | Radii | Thickness $t$, Spacing $s$ or Gap $a$ |
|---|---|---|---|---|---|
| I | $L_1$ | 1.62056 | 60.0 | $R_1 = +108.38$ | $t_1 = 19.200$ |
|   |   |   |   | $R'_N = -200.12$ | $a = 0.115$ |
|   | $L_2$ | 1.61999 | 36.4 | $R_N = -199.89$ | $t'_1 = 6.600$ |
|   |   |   |   | $R'_1 = +220.40$ | $s_1 = 0.666$ |
| II | $L_3$ | 1.62056 | 60.0 | $R_2 = +72.02$ | $t_2 = 16.658$ |
|   |   |   |   | $R'_2 = +108.38$ | $s_2 = 0.573$ |
| III | $L_4$ | 1.65833 | 51.0 | $R_3 = +47.96$ | $t_3 = 16.658$ |
|   |   |   |   | $R'_3 = +108.38$ | $s_3 = 4.477$ |
| IV | $L_5$ | 1.75524 | 27.6 | $R_4 = +371.46$ | $t_4 = 11.140$ |
| Diaphragm |   |   |   | $R'_4 = +30.74$ | $s_4 = 16.658$ |
| V | $L_6$ | 1.74414 | 45.0 | $R_5 = +56.70$ | $t_5 = 8.901$ |
|   |   |   |   | $R'_5 = -199.89$ |   |

In the lens of Example 1 the radii of the surfaces presented to the long conjugate side of the system are related as follows:

$$R_2 = 66.5\% \; R_1$$
$$R_3 = 44.3\% \; R_1$$
$$R_4 = 28.4\% \; R_1$$
$$R_5 = 52.3\% \; R_1$$

The distribution of surface powers and power sums among the five components of Example I reckons out as follows, according to the surface power formulas already given:

$\phi_1 = +5.726$ dptr.
$\phi'_1 = -2.813$ dptr.
$\phi_I = +2.913$ dptr.
$\phi_2 = +8.616$ dptr.
$\phi'_2 = -5.726$ dptr.
$\phi_{II} = +2.890$ dptr.
$\phi_3 = +13.727$ dptr.
$\phi'_3 = -6.074$ dptr.
$\phi_{III} = +7.653$ dptr.

$\phi_4 = +2.033$ dptr.
$\phi'_4 = -24.569$ dptr.
$\phi_{IV} = -22.536$ dptr.
$\phi_5 = +13.124$ dptr.
$\phi'_5 = +3.723$ dptr.
$\phi_V = +16.847$ dptr.

Example 1 thus exhibits, within the range of power distribution according to the invention, the following specific power relations:

$\phi_I = 29.13\% \ \Phi$
$\phi_I = 38.06\% \ \phi_{III}$
$\phi_{II} = 99.21\% \ \phi_I$
$\phi_V = 5.78 \cdot \phi_I$ The surface power sum $(\phi'_2 + \phi'_3)$ is $-11.800$ diopters and hence $-(\phi'_2 + \phi'_3) = 4.05 \ \phi_I$.

The lens of Example 1 can be regarded as typifying the construction of objectives according to the invention. Taking the equivalent focal length as unity and neglecting the small air space within the front doublet, it can be represented in round numbers as set forth in the accompanying Example 1, Table 2:

Example 1, Table 2

| Lens | $n$ | $\nu$ | Radii | Thickness $t$ or Spacing $s$ |
|---|---|---|---|---|
| $L_1$ | 1.62 | 60 | $R_1 = +1.1f$ | $t_1 = 0.2f$ |
|  |  |  | $R'_N = -2f$ | $R_N R'_N$ cemented together |
| $L_2$ | 1.62 | 36 | $R_N = -2f$ | $t'_1 < 0.1f$ |
|  |  |  | $R'_1 = +2.2f$ | $s_1 < 0.1f$ |
| $L_3$ | 1.62 | 60 | $R_2 = +0.7f$ | $t_2 = 0.2f$ |
|  |  |  | $R'_2 = +1.1f$ | $s_2 < 0.1f$ |
| $L_4$ | 1.66 | 51 | $R_3 = +0.5f$ | $t_3 = 0.2f$ |
|  |  |  | $R'_3 = +1.1f$ | $s_3 < 0.1f$ |
| $L_5$ | 1.76 | 27 | $R_4 = +4f$ | $t_4 = 0.1f$ |
|  |  |  | $R'_4 = +0.3f$ | $s_4 = 0.2f$ |
| $L_6$ | 1.74 | 45 | $R_5 = +0.6f$ | $t_5 = 0.1f$ |
|  |  |  | $R'_5 = -2f$ |  |

The objective of Example 2, which is illustrated in Fig. 2, was designed as an objective lens for amateur motion picture cameras having an equivalent focal length of $59/64$ inch, corresponding to 23.4 mm. Here the front radius $R_1$ of the doublet I is 1.000 inch so that the relations among the various radii may be readily inferred. Its data are given herewith:

Example 2 (linear dimensions in inches)

[Equivalent focal length $f = 59/64$ in. Relative aperture $f/1.2$.]

| Component | Lens | $n$ | $\nu$ | Radii | Thickness $t$ or Spacing $s$ |
|---|---|---|---|---|---|
| I | $L_1$ | 1.6204 | 60.3 | $R_1 = +1.0000$ | $t_1 = 0.1787$ |
|  |  |  |  | $R'_N = -2.0336$ | $R_N R'_N$ cemented together |
|  | $L_2$ | 1.6204 | 36.3 | $R_N = -2.0336$ | $t'_1 = 0.0620$ |
|  |  |  |  | $R'_1 = +2.0336$ | $s_1 = 0.0061$ |
| II | $L_3$ | 1.6204 | 60.3 | $R_2 = +0.6646$ | $t_2 = 0.1537$ |
|  |  |  |  | $R'_2 = +1.0000$ | $s_2 = 0.0053$ |
| III | $L_4$ | 1.6584 | 50.8 | $R_3 = +0.4426$ | $t_3 = 0.1537$ |
|  |  |  |  | $R'_3 = +1.0000$ | $s_3 = 0.0413$ |
| IV | $L_5$ | 1.7552 | 27.5 | $R_4 = +3.4275$ | $t_4 = 0.1047$ |
|  |  |  |  | $R'_4 = +0.2837$ | $s_4 = 0.1537$ |
| Diaphragm |  |  |  |  |  |
| V | $L_6$ | 1.7440 | 44.7 | $R_5 = +0.5232$ | $t_5 = 0.0821$ |
|  |  |  |  | $R'_5 = -1.8444$ |  |

By comparison with that of Example 1, a simplification is achieved in the objective of Example 2 by an altered choice of glasses. The biconcave element of the doublet I is made equiconvex, and in this way in Example 2, two curvatures are each employed three times—in spite of the large aperture of $f/1.2$ achieved and without sacrifice of the highly corrected properties specified at the outset of the description of applicant's invention. The two radii in question are 1.0000 and 2.0336 inches.

Example 2 strikingly shows how the components of the objective of the invention may be defined by use of the front radius $R_1$ of the doublet I as a unit of reference. With this point of departure the relations among the five components of Example 2 may be set forth as follows:

$R_1 = 1$ (unity)
$1.0 R_1 < -(R'_N, R_N) < 3.0 R_1$
$1.3 R_1 < R'_1 < 3.0 R_1$
$0.56 R_1 < R_2 < 0.88 R_1$
$0.70 R_1 < R'_2 < 1.40 R_1$
$R'_2 > R_2$
$0.36 R_1 < R_3 < 0.56 R_1$
$0.70 R_1 < R'_3 < 1.40 R_1$
$1.40 R_1 < \pm R_4 < \infty$
$0.18 R_1 < R'_4 < 0.36 R_1$
Diaphragm
$0.30 R_1 < R_5 < 0.90 R_1$
$0.60 R_1 < -R'_5 < 6.60 R_1$ Example 2 further shows the achievement of an additional simplification in that the adjacent surfaces $R'_N$ and $R_N$ are provided with equal radii and are cemented together. This pair of surfaces is strongly overcorrecting for chromatic errors, since a $\nu$-difference of 24.0 applies thereto. Consequently the front doublet I carries a substantial portion of the color correction of the objective. As a result of its construction according to the invention from a binconvex element together with a biconcave element, it permits such a distribution of radii and power as is specified by the invention, which makes possible not only theoretical design but particularly easy manufacture of the lens.

While the invention has been described herein in terms of a number of preferred embodiments, various changes may be made therein without departing from the scope of the invention, which is set forth in the appended claims.

I claim:

1. A high speed optical objective system comprising, from front to back, a doublet of meniscus shape and positive over-all power including a positive biconvex front element and a biconcave negative rear element, first and second positive meniscus components having convex front surfaces, a negative component having surfaces of unequal curvature, and, behind the diaphragm position, a positive rear component having surfaces of unequal curvature, the sum of the surface powers of the outer surfaces of the doublet lying between 0.16 and 0.40 times the total power of the system and between 0.24 and 0.48 times the sum of the surface powers of the second positive meniscus component, the sum of the surface powers of the first positive meniscus component lying between 0.60 and 1.40 times the said sum of the surface powers of the doublet, the radii $R_2$, $R_3$ and $R_5$ of the convex front surfaces of the two positive meniscus and rear components respectively and the radius $R'_4$ of the concave rear surface of the negative component having surfaces of unequal curvature being related to the radius $R_1$ of the convex front surface of the doublet as follows:

$0.56 R_1 < R_2 < 0.88 R_1$
$0.36 R_1 < R_3 < 0.56 R_1$
$0.18 R_1 < R'_4 < 0.36 R_1$
$0.30 R_1 < R_5 < 0.90 R_1$

2. A high speed optical objective system according to claim 1 in which the sum of the surface powers of the rear component lies between 4.0 and 7.6 times the sum of the surface powers of the exterior surfaces of the doublet.

3. A high speed optical system according to claim 2 in which the sum of the powers of the rear surfaces of the two positive meniscus components lie between −2.25 and −5.75 times the sum of the surface powers of the outer surfaces of the doublet.

4. A high speed optical objective system comprising, from front to back, a positive doublet component including a positive front element $L_1$ and a negative rear element $L_2$, first and second positive meniscus components $L_3$ and $L_4$, a negative component $L_5$, and, behind the diaphragm position, a positive rear component $L_6$, said system conforming substantially to the following conditions:

| Element | Index | Abbe No. | Radii | Thickness $t$ or Spacing $s$ |
|---|---|---|---|---|
| $L_1$ | 1.62 | 60 | $R_1 = +1.1f$<br>$R'_N = -2f$ | $t_1 = 0.2f$<br>$R_N R'_N$ cemented together |
| $L_2$ | 1.62 | 36 | $R_N = -2f$<br>$R'_1 = +2.2f$ | $t'_1 < 0.1f$<br>$s_1 < 0.1f$ |
| $L_3$ | 1.62 | 60 | $R_2 = +0.7f$<br>$R'_2 = +1.1f$ | $t_2 = 0.2f$<br>$s_2 < 0.1f$ |
| $L_4$ | 1.66 | 51 | $R_3 = +0.5f$<br>$R'_3 = +1.1f$ | $t_3 = 0.2f$<br>$s_3 < 0.1f$ |
| $L_5$ | 1.76 | 27 | $R_4 = +4f$<br>$R'_4 = +0.3f$ | $t_4 = 0.1f$<br>$s_4 = 0.2f$ |
| $L_6$ | 1.74 | 45 | $R_5 = +0.6f$<br>$R'_5 = -2f$ | $t_5 = 0.1f$ | in which $f$ is the equivalent focal length of the system.

5. A high speed optical objective system comprising, from front to back, a positive doublet component including a positive front element $L_1$ and a negative rear element $L_2$, first and second positive meniscus components $L_3$ and $L_4$, a negative component $L_5$, and, behind the diaphragm position, a positive rear component $L_6$, said system conforming substantially to the following conditions:

| Element | Index | Abbe No. | Radii in mm. | Thickness $t$, Spacing $s$ or Gap $a$ in mm. |
|---|---|---|---|---|
| $L_1$ | 1.62056 | 60.0 | $R_1 = +108.38$<br>$R'_N = -200.12$ | $t_1 = 19.200$<br>$a = 0.115$ |
| $L_2$ | 1.61999 | 36.4 | $R_N = -199.89$<br>$R'_1 = +220.40$ | $t'_1 = 6.600$<br>$s_1 = 0.666$ |
| $L_3$ | 1.62056 | 60.0 | $R_2 = +72.02$<br>$R'_2 = +108.38$ | $t_2 = 16.658$<br>$s_2 = 0.573$ |
| $L_4$ | 1.65833 | 51.0 | $R_3 = +47.96$<br>$R'_3 = +108.38$ | $t_3 = 16.658$<br>$s_3 = 4.477$ |
| $L_5$ | 1.75524 | 27.6 | $R_4 = +371.46$<br>$R'_4 = +30.74$ | $t_4 = 11.140$<br>$s_4 = 16.658$ |
| $L_6$ | 1.74414 | 45.0 | $R_5 = +56.70$<br>$R'_5 = -199.89$ | $t_5 = 8.901$ | said system having a focal length of substantially 100 mm. and a relative aperture of substantially $f/1.2$.

6. A high speed optical objective system comprising, from front to back, a positive doublet component including a positive front element $L_1$ and a negative rear element $L_2$, first and second positive meniscus components $L_3$ and $L_4$, a negative component $L_5$, and, behind the diaphragm position, a positive rear component $L_6$, said system conforming substantially to the following conditions:

| Element | Index | Abbe No. | Radii in in. | Thickness $t$, Spacing $s$ or Gap $a$ in in. |
|---|---|---|---|---|
| $L_1$ | 1.6204 | 60.3 | $R_1 = +1.0000$<br>$R'_N = -2.0336$ | $t_1 = 0.1787$<br>$R_N R'_N$ cemented together |
| $L_2$ | 1.6204 | 36.3 | $R_N = -2.0336$<br>$R'_1 = +2.0336$ | $t'_1 = 0.0620$<br>$s_1 = 0.0061$ |
| $L_3$ | 1.6204 | 60.3 | $R_2 = +0.6646$<br>$R'_2 = +1.0000$ | $t_2 = 0.1537$<br>$s_2 = 0.0053$ |
| $L_4$ | 1.6584 | 50.8 | $R_3 = +0.4426$<br>$R'_3 = +1.0000$ | $t_3 = 0.1537$<br>$s_3 = 0.0413$ |
| $L_5$ | 1.7552 | 27.5 | $R_4 = +3.4275$<br>$R'_4 = +0.2837$ | $t_4 = 0.1047$<br>$s_4 = 0.1537$ |
| $L_6$ | 1.7440 | 44.7 | $R_5 = +0.5232$<br>$R'_5 = -1.8444$ | $t_5 = 0.0821$ | said system having a focal length of substantially $5\tfrac{9}{64}$ inch and a relative aperture of substantially $f/1.2$.

References Cited in the file of this patent
UNITED STATES PATENTS

| | | |
|---|---|---|
| 1,812,717 | Rudolph | June 30, 1931 |
| 1,839,011 | Bieliche | Dec. 29, 1931 |
| 2,346,061 | Altman | Apr. 4, 1944 |
| 2,366,597 | Cox | Jan. 2, 1945 |
| 2,387,497 | Cox | Oct. 23, 1945 |
| 2,413,476 | Warmisham et al. | Dec. 31, 1946 |
| 2,433,438 | Cox | Dec. 20, 1947 |